(12) United States Patent
Chen et al.

(10) Patent No.: US 8,922,496 B2
(45) Date of Patent: Dec. 30, 2014

(54) MULTI-TOUCH DETECTION METHOD FOR TOUCH PANEL

(75) Inventors: Po-Yang Chen, Miao-Li County (TW); Po-Sheng Shih, Miao-Li County (TW); Chien-Yung Cheng, Miao-Li County (TW); Hsuan-Lin Pan, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 935 days.

(21) Appl. No.: 12/826,596

(22) Filed: Jun. 29, 2010

(65) Prior Publication Data

US 2011/0018837 A1    Jan. 27, 2011

(30) Foreign Application Priority Data

Jul. 24, 2009  (CN) .......................... 2009 1 0304811

(51) Int. Cl.
*G06F 3/041*  (2006.01)
*G06F 3/045*  (2006.01)
*G06F 3/0488*  (2013.01)

(52) U.S. Cl.
CPC .............. *G06F 3/0416* (2013.01); *G06F 3/045* (2013.01); *G06F 3/04883* (2013.01); *G06F 2203/04104* (2013.01)
USPC ......................................... 345/173; 345/174

(58) Field of Classification Search
CPC .......... G06F 3/044–3/047; G06F 2203/04104; H03K 17/962
USPC .................................................. 345/173–174
See application file for complete search history.

(56) References Cited

U.S. PATENT DOCUMENTS

| | | | | |
|---|---|---|---|---|
| 4,893,115 A * | 1/1990 | Blanchard | ...................... | 345/174 |
| 4,897,511 A * | 1/1990 | Itaya et al. | ................. | 178/18.05 |
| 5,181,030 A * | 1/1993 | Itaya et al. | ...................... | 341/20 |
| 5,986,646 A * | 11/1999 | Chen et al. | ..................... | 345/173 |
| 6,501,528 B1 * | 12/2002 | Hamada | ........................ | 349/158 |
| 6,538,706 B2 * | 3/2003 | Sun | .................. | 349/12 |
| 6,552,718 B2 * | 4/2003 | Ahn et al. | ..................... | 345/173 |
| 8,462,135 B1 * | 6/2013 | Xiao et al. | ..................... | 345/174 |
| 8,525,799 B1 * | 9/2013 | Grivna et al. | ................. | 345/173 |
| 2004/0119701 A1 * | 6/2004 | Mulligan et al. | ............. | 345/173 |
| 2006/0026521 A1 * | 2/2006 | Hotelling et al. | ............. | 715/702 |
| 2006/0097991 A1 * | 5/2006 | Hotelling et al. | ............. | 345/173 |
| 2007/0008299 A1 * | 1/2007 | Hristov | ........................ | 345/173 |
| 2007/0062852 A1 * | 3/2007 | Zachut et al. | ................. | 209/683 |
| 2008/0048990 A1 * | 2/2008 | Cho et al. | ..................... | 345/173 |
| 2008/0158167 A1 * | 7/2008 | Hotelling et al. | ............. | 345/173 |
| 2008/0158181 A1 * | 7/2008 | Hamblin et al. | .............. | 345/173 |
| 2009/0160798 A1 * | 6/2009 | Jiang et al. | ..................... | 345/173 |
| 2009/0167710 A1 * | 7/2009 | Jiang et al. | ..................... | 345/173 |
| 2009/0174675 A1 * | 7/2009 | Gillespie et al. | .............. | 345/173 |
| 2009/0183931 A1 * | 7/2009 | Okano et al. | ................ | 178/18.03 |
| 2009/0184934 A1 * | 7/2009 | Lin et al. | ........................ | 345/173 |
| 2009/0251434 A1 * | 10/2009 | Rimon et al. | .................. | 345/173 |
| 2009/0267903 A1 * | 10/2009 | Cady et al. | ..................... | 345/173 |

(Continued)

*Primary Examiner* — Amare Mengistu
*Assistant Examiner* — Crystal A Mathews
(74) *Attorney, Agent, or Firm* — WPAT, PC; Justin King

(57) ABSTRACT

An apparatus and a method for controlling a touch panel are disclosed herein, the apparatus includes an object detection module and an adjusting device. The object detection module can detect a position of at least one object contacting the touch panel. A position analyzer recognizes position of the object and the adjusting device can set the touch panel to a predetermined position according to the result recognized by the position analyzer.

21 Claims, 8 Drawing Sheets

(56) References Cited

U.S. PATENT DOCUMENTS

| | | | |
|---|---|---|---|
| 2009/0273579 A1* | 11/2009 | Zachut et al. | 345/174 |
| 2009/0284495 A1* | 11/2009 | Geaghan et al. | 345/174 |
| 2010/0007619 A1* | 1/2010 | Jiang et al. | 345/173 |
| 2010/0007631 A1* | 1/2010 | Chang | 345/174 |
| 2010/0066701 A1* | 3/2010 | Ningrat | 345/174 |
| 2010/0097329 A1* | 4/2010 | Simmons et al. | 345/173 |
| 2010/0097343 A1* | 4/2010 | Fang | 345/174 |
| 2010/0117981 A1* | 5/2010 | Chen et al. | 345/174 |
| 2010/0149110 A1* | 6/2010 | Gray | 345/173 |
| 2010/0188345 A1* | 7/2010 | Keskin et al. | 345/173 |
| 2011/0007026 A1* | 1/2011 | Chen et al. | 345/174 |
| 2011/0084936 A1* | 4/2011 | Chang et al. | 345/174 |
| 2011/0227863 A1* | 9/2011 | Cheng et al. | 345/174 |
| 2012/0068964 A1* | 3/2012 | Wright et al. | 345/174 |
| 2013/0015908 A1* | 1/2013 | Shih et al. | 327/517 |

\* cited by examiner

MULTI-TOUCH DETECTION METHOD FOR TOUCH PANEL

BACKGROUND

1. Technical Field

The disclosure generally relates to a touch panel, and more particularly, to a multi-touch detection method for a touch panel.

2. Description of Related Art

Types of conventional touch panels mainly comprise resistive touch panels, capacitive touch panels, infrared rays touch panels, and surface acoustic wave touch panels. Generally, resistive touch panels, such as four lines type or five lines type touch panels, can only detect a single touch action at the same time in use because voltage variations of conductive films are detected by using an analogical method. When users touch resistive touch panels in a multi-touch action, an erroneous operation may be generated.

US patent applications No. US2006/0097991 and US2008/0158181 disclose structures of capacitive touch panels capable of performing multi-touch detection, which generally include two transparent conductive layers respectively disposed on opposite side surfaces of transparent glass substrates. According to the product resolution, two transparent conductive layers need to be respectively processed through a photolithography process. Conducting wires formed on the same transparent conductive layer are disposed apart and in parallel to each other. The conducting wires formed on one of the transparent conductive layers are perpendicular to that formed on another transparent conductive layer. During operation, by repeating to scan each of the conducting wires, variations of capacitances thereof are analyzed to determine the coordinates of contact points of users' fingers.

However, the difficult photolithography processes are necessary for forming the foregoing capacitive touch panels. The product yield may be low due to the difficult photolithography processes. The driving method is complex for recognizing the contact point on touch panel. Accordingly, although capacitive touch panels can be applied for detecting multi-touch action, the high cost limits the scope of the application.

SUMMARY

An embodiment of the disclosure provides a multi-touch detection method for determining the coordinates of contact points while the contact points are very close.

An embodiment of the disclosure provides a multi-touch detection method for a touch panel. The touch panel includes a first conductive layer and a second conductive layer which are overlapped. The first conductive layer has a plurality of first electrodes disposed along a first-axis direction, and the second conductive layer has a plurality of second electrodes disposed along a second-axis direction. The multi-touch detection method includes following steps. The second electrodes are sensed to obtain a first voltage function when a first voltage is provided to the first electrodes. The second electrodes are sensed to obtain a second voltage function when the first voltage is provided to a first portion of the first electrodes and is not provided to a second portion of the first electrodes. Positions of a first contact point and a second contact point in the second-axis direction is calculated by using the first and the second voltage functions.

Another embodiment of the disclosure provides a multi-touch detection method for a touch panel, wherein the touch panel includes a first conductive layer and a second conductive layer which are overlapped. The first conductive layer has a plurality of first electrodes disposed along a first-axis direction. The second conductive layer has a plurality of second electrodes and third electrodes, and the second electrodes and the third electrodes are respectively disposed at different sides of the second conductive layer along the first-axis direction. The multi-touch detection method includes following steps. The second electrodes are sensed to obtain a first voltage function when a first voltage is provided to a first portion of the first electrodes and is not provided to a second portion of the first electrodes. The third electrodes are sensed to obtain a second voltage function when the first voltage is provided to the second portion of the first electrodes and is not provided to the first portion of the first electrodes. A position corresponding to an extreme value of the first voltage function is deemed as a position of the first contact point in the second-axis direction. A position corresponding to an extreme value of the second voltage function is deemed as a position of the second contact point in the second-axis direction.

In an embodiment of the disclosure, the first conductive layer and the second conductive layer are anisotropic in electric conductivity. For example, a low impedance direction of the second conductive layer is the first-axis direction, and a low impedance direction of the first conductive layer is the second-axis direction. In an embodiment of the disclosure, the first conductive layer and the second conductive layer are conductive films formed with carbon nanotubes arranged substantially in parallel.

Based on the above, in an embodiment of the disclosure, the multi-touch detection method reads the first voltage function including the first and the second contact points while the two contact points are very close, and then reads the second voltage function including the first contact point, simultaneously obtaining the position of the first contact point, by driving a portion of the electrodes of the conductive layer. Finally, the position of the second contact point is calculated by the first and the second voltage functions. In another embodiment of the disclosure, a set of electrodes is disposed at each of the right and left sides of the conductive layer. The multi-touch detection method can still obtain the positions of the first and the second contact points through the electrode sets respectively disposed at the right and left sides of the conductive layer by driving a portion of the electrodes of the conductive layer while the two contact points are very close.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
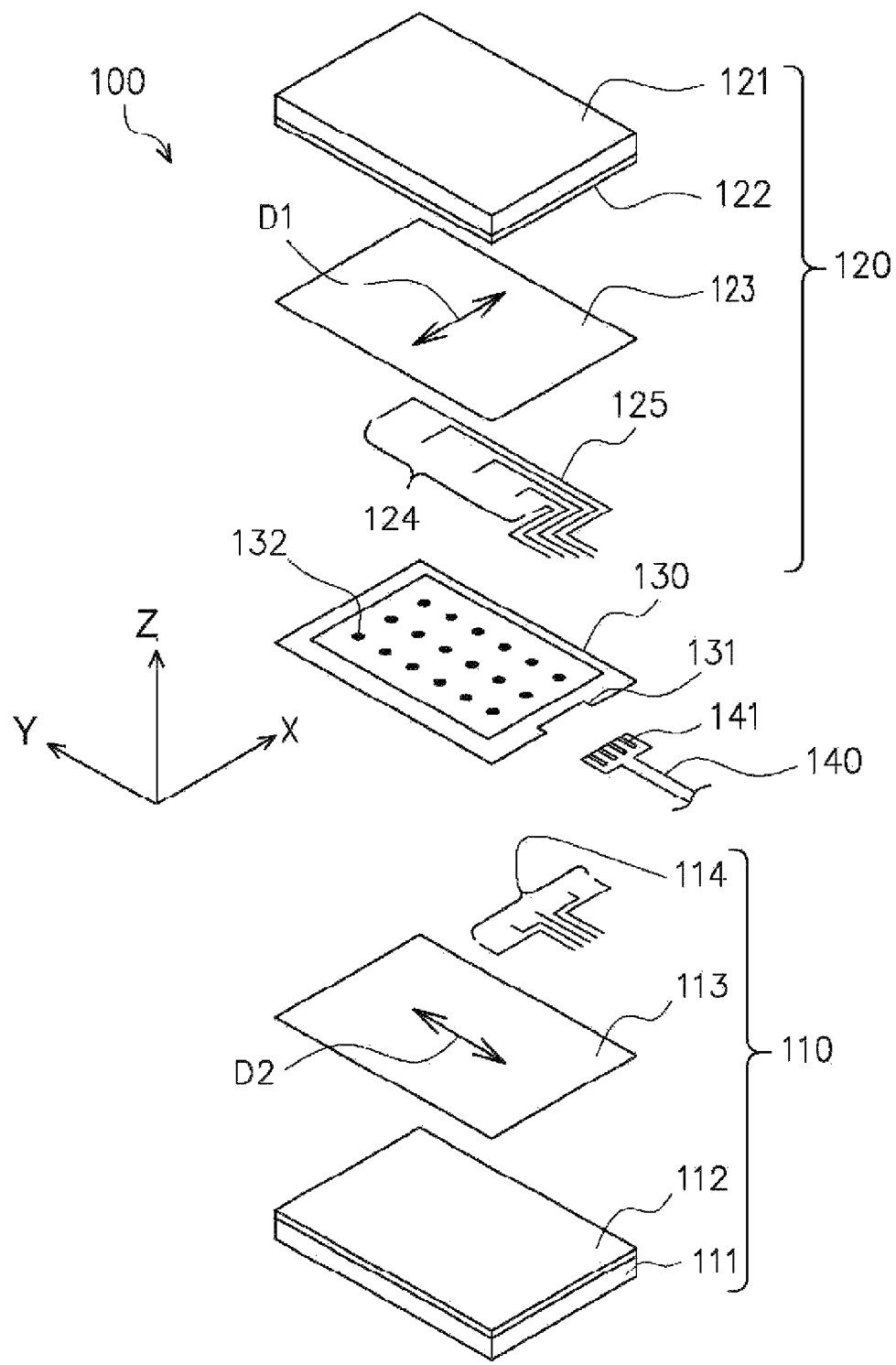
FIG. 1 is a schematic diagram showing an assembly structure of a resistive touch panel according to an embodiment of the disclosure.

FIG. 1 is a schematic diagram showing an assembly structure of a resistive touch panel 100 according to an embodiment of the disclosure. Cartesian coordinate system is introduced in FIG. 1, which includes X-axis direction, Y-axis direction, and Z-axis direction perpendicular to one another. First electrodes 114 and second electrodes 124 are respectively and simply shown by five electrodes in FIG. 1. However, in practice, the numbers of first electrodes 114 and second electrodes 124 can be determined based on the area of touch panel or the application field.

As shown in FIG. 1, the touch panel 100 is formed by a first conductive film 110 and an partially overlapping second conductive film 120. The first conductive film 110 and the second conductive film 120 are adhered by a ringed adhesive layer 130. There are a plurality of insulating spacers 132 uniformly distributed between the first conductive film 110 and the second conductive film 120, such that the two conductive films 110 and 120 are separated by a constant distance.

The first conductive film 110 includes a substrate 111 and a first conductive layer 113, wherein the first conductive layer 113 is adhered to the surface of the substrate 111 by an adhesive layer 112. A plurality of first electrodes 114 are disposed at one side of the first conductive layer 113 along a first-axis direction such as the X-axis direction. Herein, distances between adjacent two of the first electrodes 114 are identical, and the first electrodes 114 are respectively electrically connected to the first conductive layer 113. The ends of the first electrodes 114 extend to the center of the lower edge of the first conductive film 110 for transmitting signals to the outside.

The second conductive film 120 includes a substrate 121 and a second conductive layer 123, wherein the second conductive layer 123 is adhered to the surface of the substrate 121 by an adhesive layer 122. A plurality of second electrodes 124 are disposed at one side of the second conductive layer 123 along a second-axis direction such as the Y-axis direction. Distances between adjacent two of the second electrodes 124 are identical, and the second electrodes 124 are respectively electrically connected to the second conductive layer 123. The second electrodes 124 are connected to conducting wires 125 which are arranged in parallel at the right side of the second conductive film 120. The conducting wires 125 extend along the edge at the right side of the second conductive layer 123, and the ends of the conducting wires 125 extend to the center of the lower edge of the second conductive film 120 for transmitting signals to the outside.

The touch panel 100 further includes a flexible printed circuit board 140 which has a plurality of metal connecting points 141, and there is a notch 131 in the center of the lower edge of the ringed adhesive layer 130. During the assembly, the notch 131 corresponds to the flexible printed circuit board 140, and the upper and the lower metal connecting points 141 of the flexible printed circuit board 140 can be electrically connected to the ends of the conducting wires of the first conductive film 110 and the second conductive film 120, such that external electronic signals can be transmitted to the first electrodes 114 of the first conductive film 110 and the second electrodes 124 of the second conductive film 120.

In an embodiment of the disclosure, the substrates 111 and 121 used in the touch panel 100 include transparent materials, such as polyethylene (PE), polycarbonate (PC), polyethylene terephthalate (PET), polymethyl methacrylate (PMMA), or thin glass substrates. The materials of the ringed adhesive layer 130 and the adhesive layers 112 and 122 may be thermal-cured glue or UV-cured glue.

Taiwan patent publication (No. TW 200920689), "Apparatus And Method For Synthesizing Films of Carbon Nanotubes", discloses a method for synthesizing films of carbon nanotubes. By the method, films of carbon nanotubes which are conductive can be generated, and the method can also be applied to fabricate transparent and conductive films because the films are fabricated by drawing through super vertical-aligned carbon nanotube array in the method.

In order to enhance the reliability of the touch panel 100 and reduce the frame width of the touch panel 100, the first conductive layer 113 and the second conductive layer 123 of the embodiment of the disclosure are formed by conductive films of carbon nanotubes through the above method. However, during the drawing process, the long chain-shaped carbon nanotubes are substantially arranged in parallel along the drawing direction, and the conductive films of carbon nanotubes have lower impedance in the drawing direction. The first conductive layer 113 and the second conductive layer 123 are anisotropic in electric conductivity. The impedance of the conductive films in the direction perpendicular to the drawing direction is about 50~350 times of that of the conductive films in the drawing direction. The surface resistance of the conductive films is between 1 KΩ and 800 KΩ based on the positions and the direction of the measurement.

As shown in FIG. 1, in the embodiment of the disclosure, the first conductive layer 113 has a main conductive direction D1 such as the drawing direction of the original conductive film, and the second conductive layer 123 has another main conductive direction D2. In the present embodiment, the main conductive direction D1, i.e. the low impedance direction, of the first conductive layer 113 and the main conductive direction D2 of the second conductive layer 123 are substantially perpendicular to each other. For example, the low impedance direction D2 of the second conductive layer 123 is the X-axis direction, and the low impedance direction D1 of the first conductive layer 113 is the Y-axis direction. Herein, the impedances of the first conductive layer 113 and the second conductive layer 123 in the direction perpendicular to the main conductive direction are about 100 to 200 times of those of the first conductive layer 113 and the second conductive layer 123 in the main conductive directions D1 and D2.

Following embodiments simply show two contact points as examples when the touch panel 100 operates. However, during practical operation, the multi-touch detection method in the embodiments of the disclosure can be suitable for a plurality of contact points.

Figure 2:
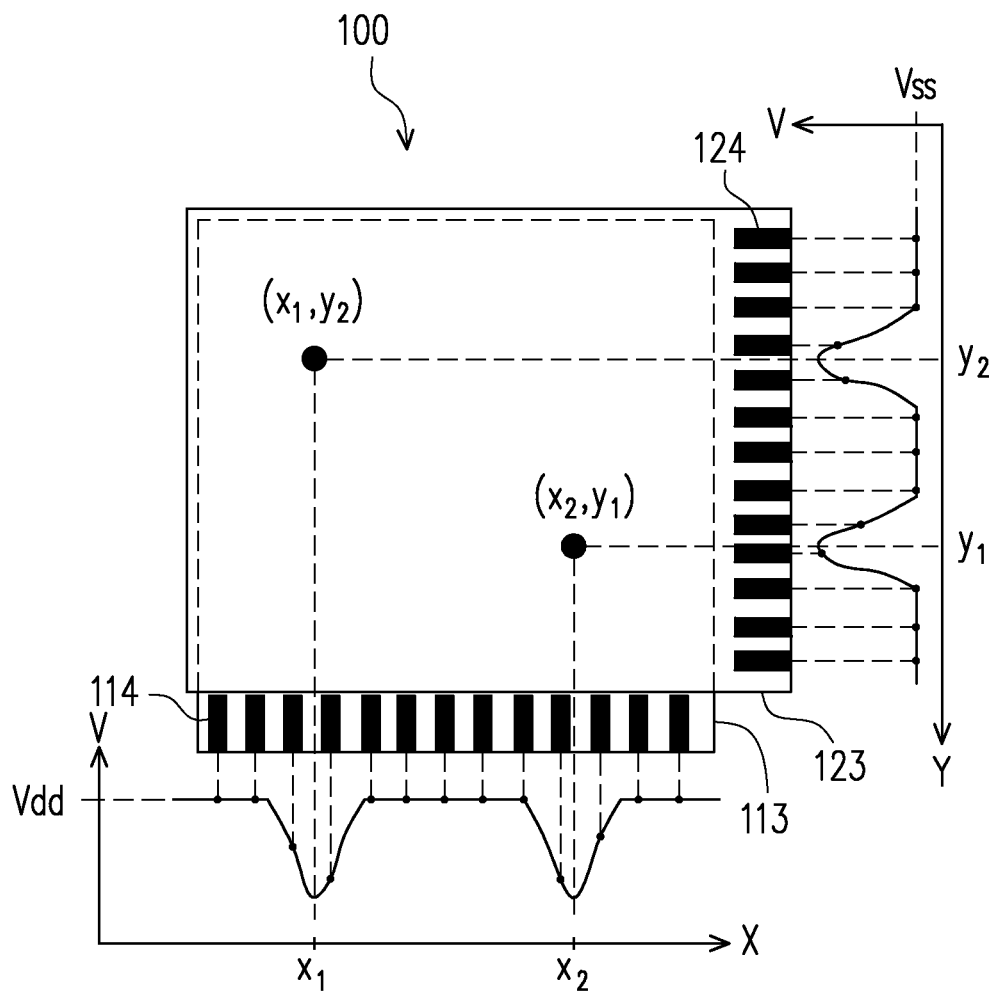
FIG. 2 illustrates voltage functions sensed by the touch panel of FIG. 1 according to an embodiment of the disclosure.

FIG. 2 illustrates voltage functions sensed by the touch panel 100 of FIG. 1 according to an embodiment of the disclosure. The second electrodes 124 of the second conductive layer 123 are supplied with a second voltage such as a ground voltage Vss. When the ground voltage Vss is provided to each of the second electrodes 124, the sensing circuit (not shown) can sequentially sense each of the first electrodes 114 of the first conductive layer 113 one by one. When one of the first electrodes 114 is sensed, the other first electrodes 114 which are not sensed yet are provided with a first voltage such as a system voltage Vdd. Accordingly, the voltage function of the X-axis can be obtained according to the positions of each of the first electrodes 114 (corresponding to the X-axis position) and the sensed voltages. FIG. 2 illustrates an exemplary case that the touch panel 100 has two contact points. In the positions of the contact points, the first conductive layer 113 and the second conductive layer 123 are electrically connected. Because the electric conductivity of the first conductive layer 113 is anisotropic, the voltages of the X-axis positions $x_1$ and $x_2$ of the two contact points are pulled down, and the voltages of the other positions are substantially maintained at the level of the system voltage Vdd. Accordingly, the positions corresponding to two extreme values of the X-axis voltage function are respectively deemed as the positions of the first contact point and the second contact point in the X-axis direction. Herein, the extreme value is a relative minimum.

Similarly, when one of the second electrodes 124 of the second conductive layer 123 is sensed, the first electrodes 114 of the first conductive layer 113 are supplied with the system voltage Vdd. At this time, the sensing circuit (not shown in the figures) can sequentially sense each of the second electrodes 124 one by one. When one of the second electrodes 124 is sensed, the other second electrodes 124 which are not sensed yet are provided with the ground voltage Vss. Accordingly, the voltage function of the Y-axis can be obtained according to the positions of each of the second electrodes 124 corresponding to the Y-axis position and the sensed voltages. Because of the anisotropic electric conductivity of the second conductive layer 123, the voltages of the Y-axis positions $y_1$ and $y_2$ of the two contact points are pulled up, and the voltages of the other positions are substantially maintained at the level of the ground voltage Vss. Accordingly, the positions corresponding to two extreme values of the Y-axis voltage function are respectively deemed as the positions of the first contact point and the second contact point in the Y-axis direction. Herein, the extreme value is a relative maximum.

The curve of the continuous function illustrated in FIG. 2 is a schematic diagram. In practice, the voltage read by the first electrodes 114 and the second electrodes 124 are discrete values. Using discrete values to obtain the relative maximum and/or the relative minimum of the voltage function is well-known for those ordinarily skilled in the art, and it will not be described again herein.

Figure 3:
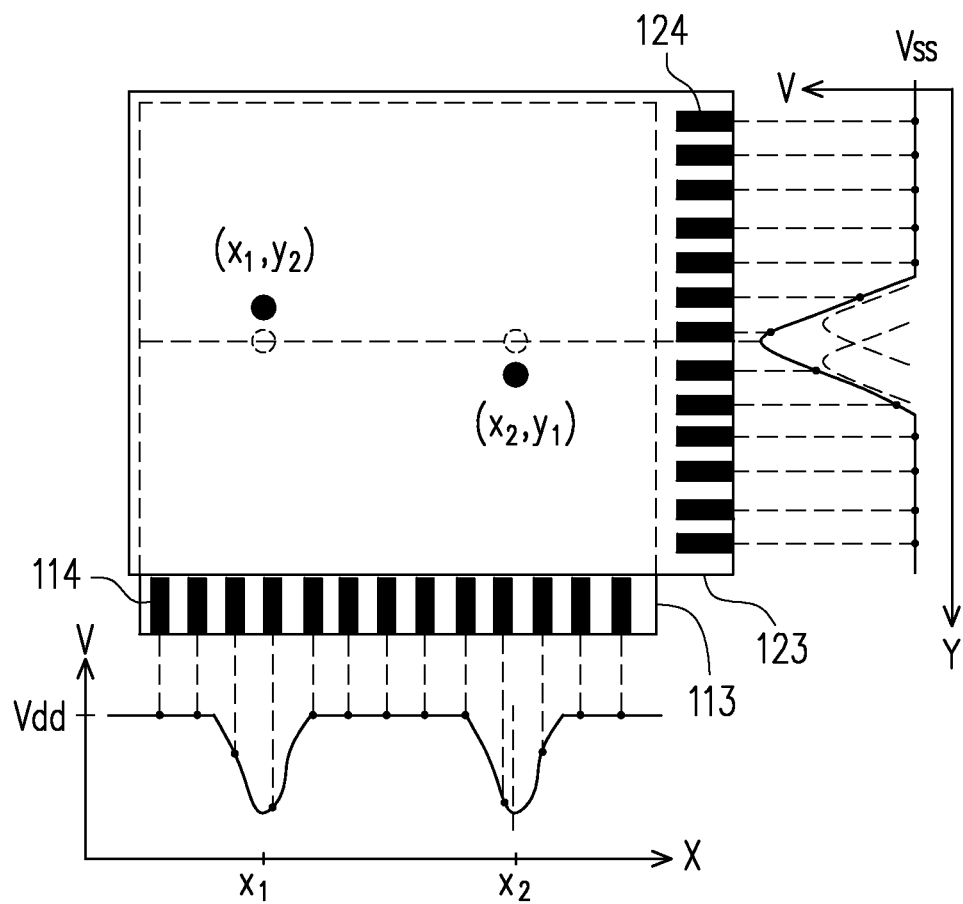
FIG. 3 illustrates voltage functions sensed by the touch panel of FIG. 1 according to an embodiment of the disclosure.

FIG. 3 illustrates voltage functions sensed by the touch panel 100 of FIG. 1 according to an embodiment of the disclosure. FIG. 3 is similar to FIG. 2, the difference therebetween lies in that, the Y-axis positions $y_1$ and $y_2$ of the two contact points are very close, such that two waveforms of the Y-axis positions $y_1$ and $y_2$ are overlapped to form a larger waveform in the Y-axis voltage function. Accordingly, after sensing the second electrodes 124, the sensing circuit (not shown) only obtains an extreme value in the Y-axis voltage function. The system may erroneously determine the position corresponding to the extreme value as the positions of the two contact points, i.e. dotted line circles in FIG. 3. However, the exact positions of the two contact points are the Y-axis positions $y_1$ and $y_2$. This type of sensing error may be overcome by sensing methods performed in following embodiments.

First Embodiment

Figure 4A:
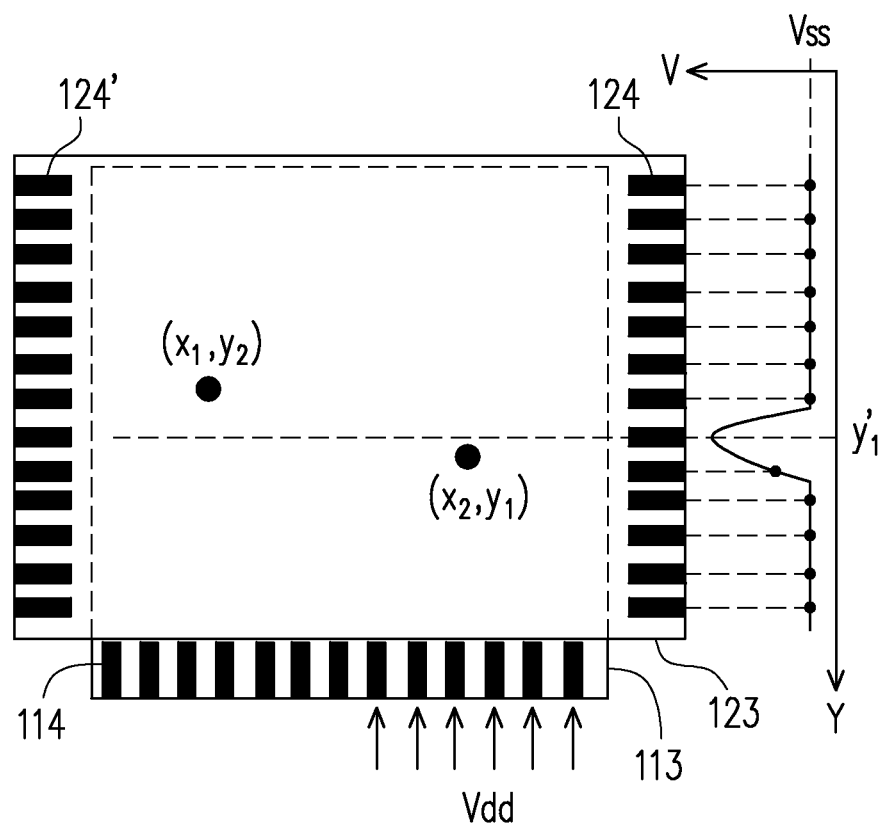
FIG. 4A and FIG. 4B illustrate a multi-touch detection method according to an embodiment of the disclosure.
Figure 4B:
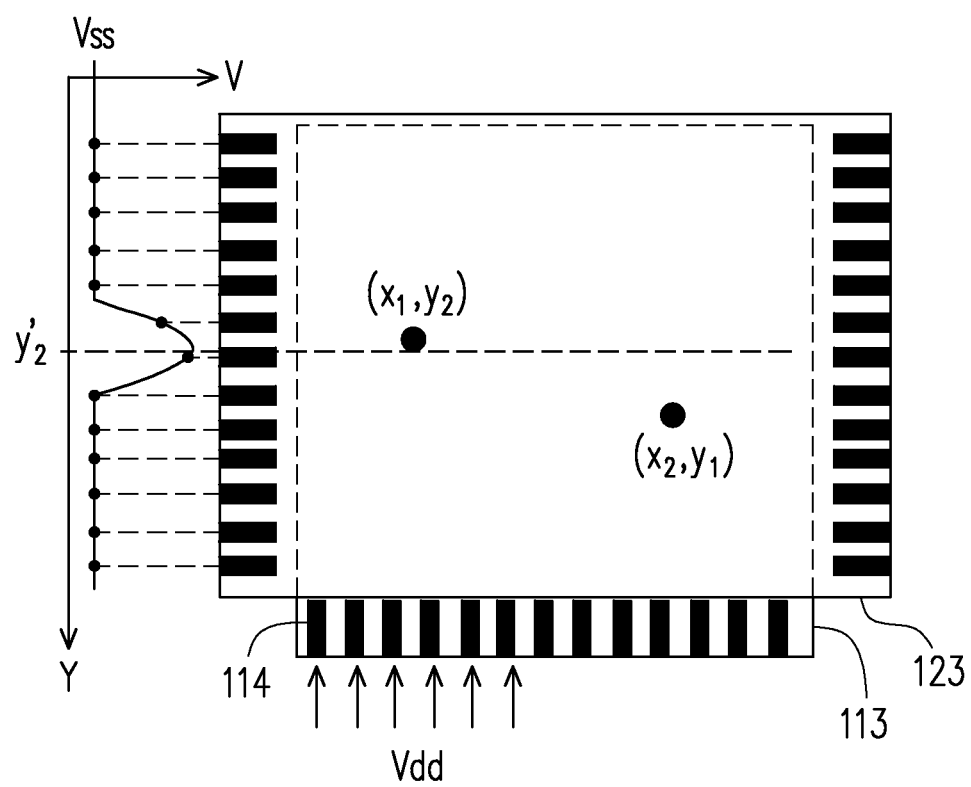

FIG. 4A and FIG. 4B illustrate a multi-touch detection method according to a first embodiment of the disclosure. In the present embodiment, the second conductive layer 123 of the touch panel 100 has a plurality of electrodes 124 and 124' disposed along the Y-axis direction. The electrodes 124 and 124' are respectively disposed at different sides of the second conductive layer 123 along the X-axis direction, such as the left side and the right side of the second conductive layer 123 shown in FIG. 4A. The detail not described in the present embodiment can refer to the embodiments of FIG. 1 to FIG. 3. When the electrodes 124 and/or 124' are/is provided with the second voltage such as the ground voltage Vss, the first electrodes 114 are sensed to obtain the voltage function along the X-axis. The positions corresponding to two extreme values of the X-axis voltage function are respectively deemed as the position $x_2$ of the first contact point p1 and the position $x_1$ of the second contact point p2 in the X-axis direction. In the foregoing, when the first electrodes 114 are sequentially sensed, the other first electrodes 114 which are not sensed yet are provided with the first voltage such as the system voltage Vdd.

When the sensing error as described in FIG. 3 occurs, following steps are proceeded to obtain the Y-axis positions $y_1$ and $y_2$ of the two contact points or the approximate positions thereof. First, the system voltage Vdd is provided to drive a first portion of the first electrodes 114 but not provided to a second portion of the first electrodes 114. In FIG. 4A and FIG. 4B, the first electrodes 114 are divided into two portions. However, in other embodiments, the first electrodes 114 may be divided into three or more portions. During the process of driving the first electrodes 114, the system voltage Vdd can be sequentially provided to each portion of the first electrodes 114. In addition, the portions of the first electrodes 114 which are not provided with the system voltage Vdd yet can be coupled to other reference voltages or be floated. In the present embodiment, the portions of the first electrodes 114 which are not provided with the system voltage Vdd yet are coupled to the ground voltage Vss.

Referring to FIG. 4A, when the system voltage Vdd is provided to the right half portion of the first electrodes 114, and the ground voltage Vss is provided to the left half portion of the first electrodes 114, the second electrodes 124 are sensed to obtain a first voltage function of the Y-axis. When the second electrodes 124 are sequentially sensed, the ground voltage Vss is provided to the second electrodes 124 which are not sensed yet. Regarding the contact point on the left side of the touch panel 100, the first conductive layer 113 is not provided with voltages for pulling up, such that the contact point rarely provides contribution to the first voltage function of the Y-axis. Accordingly, the position $y_1$' corresponding to the extreme values of the first voltage function can be deemed as the position $y_1$ of the contact point on the right side of the touch panel 100 in the Y-axis direction.

Referring to FIG. 4B, the system voltage Vdd is provided to the left half portion of the first electrodes 114 but not provided to the right half portion of the first electrodes 114. When the system voltage Vdd is provided to the left half portion of the first electrodes 114, and the ground voltage Vss is provided to the right half portion of the first electrodes 114, the electrodes 124' are sensed to obtain a second voltage function of the Y-axis. When the electrodes 124' are sequentially sensed, the ground voltage Vss is provided to the electrodes 124' which are not sensed yet. Regarding the contact point on the right side of the touch panel 100, the first conductive layer 113 is not provided with voltages for pulling up, such that the contact point rarely provides contribution to the second voltage function of the Y-axis. Accordingly, the position $y_2$' corresponding to the extreme values of the second voltage function can be deemed as the position $y_2$ of the contact point on the left side of the touch panel 100 in the Y-axis direction.

Therefore, even if the Y-axis positions $y_1$ and $y_2$ of the two contact points are very close, the Y-axis positions of the two contact points can still be respectively sensed in the present embodiment. It should be noted that, in the present embodiment, the case, "the Y-axis positions $y_1$ and $y_2$ of the two contact points are very close," is exemplary, and thereby those ordinarily skilled in the art can be taught based on the present embodiment and analogize to other condition. For example, two sets of electrodes can be disposed at two sides of the first conductive layer 113 of the touch panel 100 in the Y-axis direction. By the way, FIG. 4B does not show the electrodes at the upper side. By sequentially providing the ground voltage Vss to the upper and lower half portions of the electrodes 124, even if the X-axis positions $x_1$ and $x_2$ are very close, the X-axis positions $x_1$ and $x_2$ of the two contact points can still be read respectively by the electrodes disposed at the two sides of the first conductive layer 113.

Second Embodiment

Figure 5A:
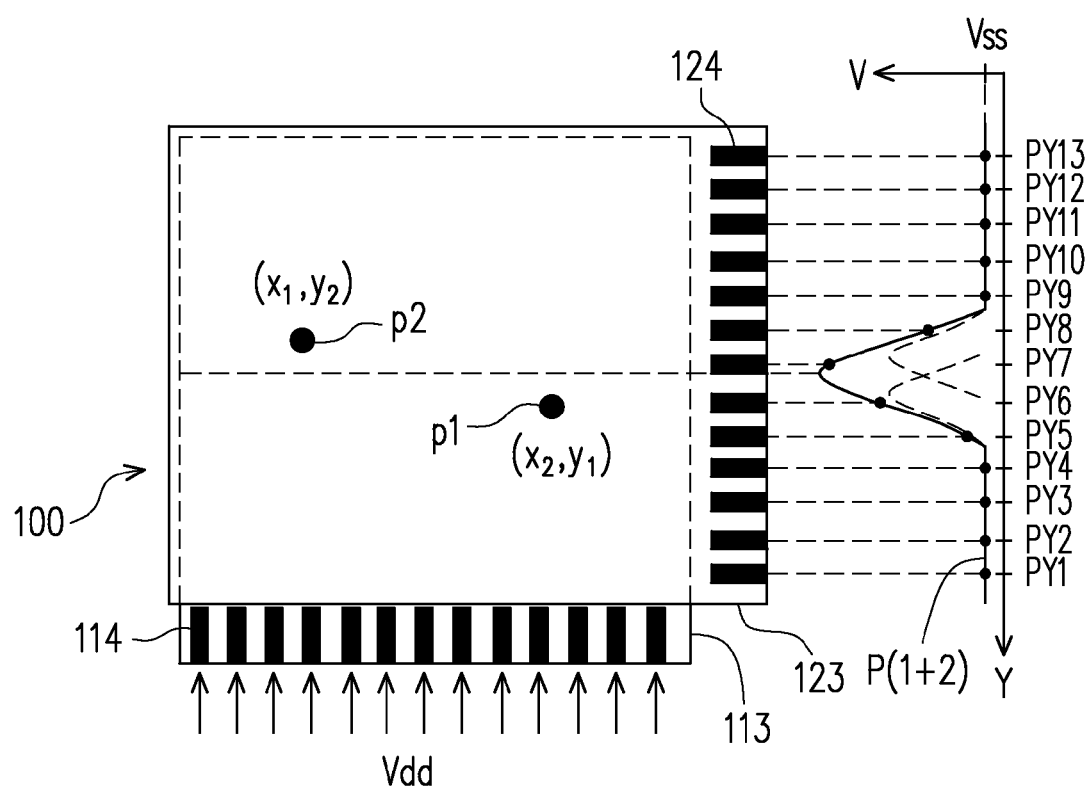
FIG. 5A, FIG. 5B, and FIG. 5C illustrate a multi-touch detection method according to an embodiment of the disclosure.
Figure 5B:
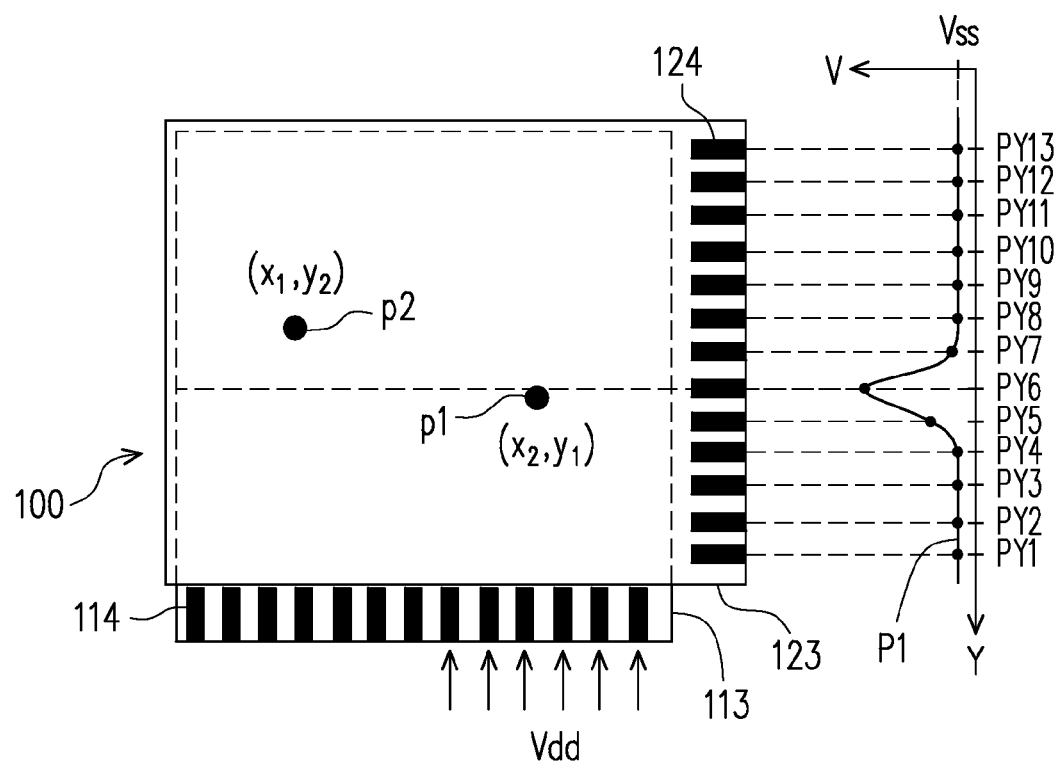
Figure 5C:
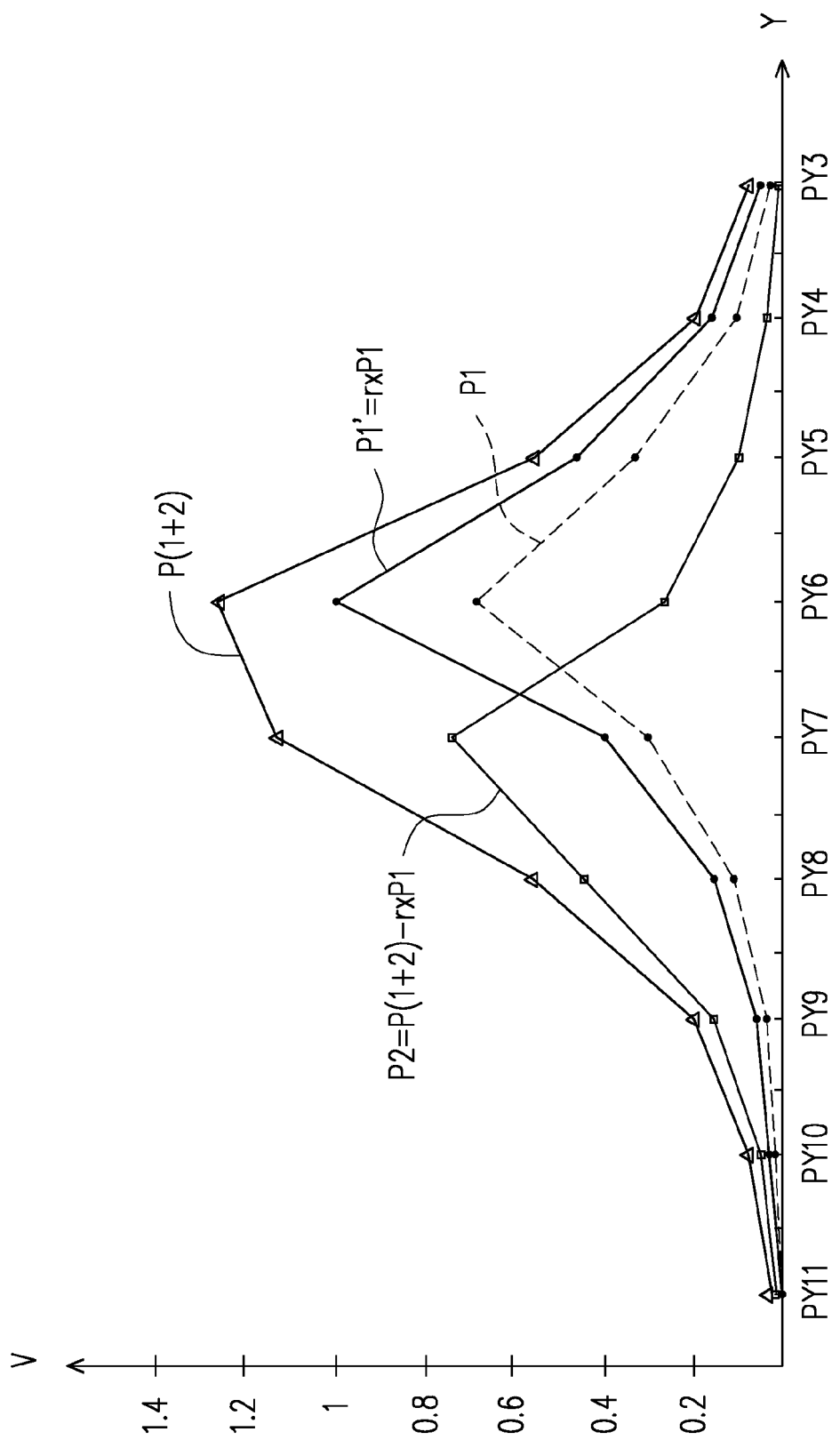

In consideration of the volume of products, the electrodes can simply be disposed at a single side of the first conductive layer 113 and a single side of the second conductive layer 123. FIG. 5A, FIG. 5B and FIG. 5C illustrate a multi-touch detection method according to a second embodiment of the disclosure, wherein symbols PY1-PY13 represent the second electrodes 124 of the second conductive layer 123. The detail not described in the present embodiment can refer to the embodiments of FIG. 1 to FIG. 3 and FIG. 4A to FIG. 4B. When one of the second electrodes 124 of the second conductive layer 123 is sensed, all of the first electrodes 114 of the first conductive layer 113 are supplied with the first voltage such as the system voltage Vdd. When the second electrodes 124 are sequentially sensed, the other second electrodes 124 which are not sensed yet are provided with the second voltage such as the ground voltage Vss. According to the position of each of the second electrodes 124 corresponding to the Y-axis position and the sensed voltages, the voltage function P(1+2) which is formed by the two waveforms of the contact points p1 and p2 overlapped between the positions $y_1$ and $y_2$ can be obtained.

Following steps showing how to obtain the Y-axis positions $y_1$ and $y_2$ of the two contact points p1 and p2 or the approximate positions thereof. First, the system voltage Vdd is provided to a first portion of the first electrodes 114 but not provided to a second portion of the first electrodes 114. In FIG. 5B, the first electrodes 114 are divided into two portions. However, in other embodiments, the first electrodes 114 may be divided into three or more portions. In addition, the portions of the first electrodes 114 which are not provided with the system voltage Vdd yet can be coupled to other reference voltages or be floated. In the present embodiment, the portions of the first electrodes 114 which are not provided with the system voltage Vdd yet are coupled to the ground voltage Vss.

Similar to FIG. 4A, FIG. 5B illustrates that when the system voltage Vdd is provided to a portion of the first electrodes 114 (the right half portion in FIG. 5B) and is not provided to another portion of the first electrodes 114 (the left half portion in FIG. 5B), the second electrodes 124 are sensed to obtained a voltage function P1. Next, the positions of the contact points p1 and p2 in the Y-axis direction are calculated by the voltage functions P(1+2) and P1. It will be described in detail as follows.

Referring to FIG. 5C, regarding the contact point p2 on the left side of the touch panel 100, the first conductive layer 113 is not provided with voltages for pulling up, such that the contact point p2 rarely provides contribution to the voltage function P1. Accordingly, the position corresponding to the extreme values of the voltage function P1 can be deemed as the position $y_1$ of the contact point p1 on the right side of the touch panel 100 in the Y-axis direction.

In the present embodiment, a correction parameter r is provided, and then the voltage function P1 is multiplied by the correction parameter r to obtain a voltage function P1', i.e. P1'=r×P1. The voltage function P1' can represent the Y-axis voltage function corresponding to the only one contact point p1 on the touch panel 100. The correction parameter r may be generated through a lookup table. By providing the lookup table in the present embodiment, the lookup table is searched to obtain the correction parameter r according to the position $x_2$ of the contact point p1 in the X-axis direction.

An equation P2=P(1+2)−r×P1 is calculated to obtain a voltage function P2, and then the position corresponding to an extreme value of the voltage function P2 is deemed as the position $y_2$ of the contact point p2 in the Y-axis direction. Herein, the extreme value is a relative maximum. Therefore, even if the Y-axis positions $y_1$ and $y_2$ of the two contact points p1 and p2 are very close, the Y-axis positions of the two contact points can still be respectively sensed in the present embodiment. It should be noted that, in the present embodiment, the case, "the Y-axis positions $y_1$ and $y_2$ of the two contact points are very closed," is just one of examples to explain the disclosure, and thereby those of ordinary skilled in the art can be taught based on the present embodiment and analogize to other condition. For example, when the X-axis positions $x_1$ and $x_2$ are very close, the ground voltage Vss is provided by the methods "complete driving" and "partial driving". Next, the voltage function which is formed by the two waveforms of the contact points p1 and p2 overlapped on the X-axis and the voltage function corresponding to the only one contact point p1 are obtained. Finally, the positions (or the approximate positions) of the contact points p1 and p2 on the touch panel 100 in the X-axis direction are calculated by the two foregoing voltage functions.

In other embodiments, the correction parameter r may be unnecessary, such that the preparation for the lookup table is omitted, and the complexity of calculating is reduced. That is, the foregoing step of "calculating the equation P2=P(1+2)−r×P1" is modified as the step of "calculating equation P2=P(1+2)−P1" to obtain the voltage function P2, and further obtain the position $y_2$ of the contact point p2 in the Y-axis direction.

Third Embodiment

In the present embodiment, a step similar to that of the second embodiment is adopted to obtain the voltage functions P(1+2) and P1. The difference between the present embodiment and the second embodiment lies in the formula for calculating the positions of the contact points p1 and p2 in the Y-axis direction by using the voltage functions P(1+2) and P1.

In the present embodiment, the position corresponding to an extreme value, which is a relative maximum herein, of the voltage function P(1+2) is deemed as a central position pm, and the position corresponding to an extreme value, which is a relative maximum herein, of the voltage function P1 is deemed as the position of the contact point p1. In this case, the central position pm is located between the positions of the contact points p1 and p2, such that when the central position pm and the position of the contact point p1 are given, the position of the contact point p2 can simply be obtained by the midpoint equation. For example, the equation p2=2×pm−p1 is calculated to obtain the position of the contact point p2. Compared with that in the second embodiment, the error in the present embodiment is larger but the operation can be substantially simplified.

To sum up the foregoing embodiments, the voltage function P(1+2) including the contact points p1 and p2 is read while the two contact points are very close. Next, the voltage function P1 including the contact point p1 is read, simultaneously obtaining the position of the first contact point p1, by driving a portion of the electrodes of the conductive layer. Finally, the position of the contact point p2 is calculated by the voltage functions P(1+2) and P1. In the first embodiment, a set of electrodes is disposed at each of the right and left sides of the second conductive layer. The multi-touch detection method can still obtain the positions of the contact points p1 and p2 through the electrode sets respectively disposed at the right and left sides of the second conductive layer by driving a portion of the electrodes of the first conductive layer while the two contact points are very close.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A multi-touch detection method for a touch panel, wherein the touch panel comprises a first conductive layer and an overlapping second conductive layer, the first conductive layer having a plurality of first electrodes disposed along a first-axis direction, and the second conductive layer having a plurality of second electrodes disposed along a second-axis direction, the multi-touch detection method comprising:
sensing the second electrodes sequentially to obtain a first voltage function when a first voltage is provided to the first electrodes;
sensing the second electrodes sequentially to obtain a second voltage function when the first voltage is provided to a first portion of the first electrodes simultaneously and is not provided to a second portion of the first electrodes; and
calculating positions of a first contact point and a second contact point in the second-axis direction by the first and the second voltage functions;
wherein the first portion of the first electrodes contains at least two first electrodes, wherein the second portion of the first electrodes contains at least two first electrodes;
wherein when the second electrodes are sequentially sensed, a ground voltage is provided to the second electrodes before being sensed.

2. The multi-touch detection method as claimed in claim 1, wherein the first conductive layer and the second conductive layer are anisotropic in electric conductivity.

3. The multi-touch detection method as claimed in claim 2, wherein the first conductive layer and the second conductive layer each have a low impedance direction and a high impedance direction, the low impedance direction of the second conductive layer is the first-axis direction, and the low impedance direction of the first conductive layer is the second-axis direction.

4. The multi-touch detection method as claimed in claim 2, wherein the first conductive layer and the second conductive layer are conductive films formed by carbon nanotubes substantially arranged in parallel.

5. The multi-touch detection method as claimed in claim 1, wherein the first-axis direction and the second-axis direction are substantially perpendicular to each other.

6. The multi-touch detection method as claimed in claim 1, further comprising: when the second electrodes are sequentially sensed, providing a second voltage to the second electrodes which are not sensed.

7. The multi-touch detection method as claimed in claim 1, further comprising: when the first voltage is provided to the first portion of the first electrodes, providing a second voltage to the second portion of the first electrodes.

8. The multi-touch detection method as claimed in claim 1, wherein the step of calculating the positions of the first contact point and the second contact point in the second-axis direction by the first and the second voltage functions comprises:
providing a correction parameter r;
deeming a position corresponding to an extreme value of the second voltage function as the position of the first contact point in the second-axis direction;
calculating an equation P2=P(1+2)−r×P1 to obtain a third voltage function P2, wherein P(1+2) represents the first voltage function, and P1 represents the second voltage function; and
deeming a position corresponding to an extreme value of the third voltage function P2 as the position of the second contact point in the second-axis direction.

9. The multi-touch detection method as claimed in claim 8, wherein the step of providing the correction parameter r comprises:
providing a lookup table; and
searching the lookup table to obtain and provide the correction parameter r according to a position of the first contact point in the first-axis direction.

10. The multi-touch detection method as claimed in claim 1, wherein the step of calculating the positions of the first contact point and the second contact point in the second-axis direction by the first and the second voltage functions comprises:
deeming a position corresponding to an extreme value of the first voltage function as a central position;
deeming a position corresponding to an extreme value of the second voltage function as the position of the first contact point in the second-axis direction; and
calculating an equation p2=2×pm−p1 to obtain a position of the second contact point p2, wherein pm represents the central position, and p1 represents the position of the first contact point.

11. The multi-touch detection method as claimed in claim 1, further comprising:
sensing the first electrodes to obtain a fourth voltage function when a second voltage is provided to the second electrodes; and
respectively deeming positions corresponding to two extreme values of the fourth voltage function as positions of the first contact point and the second contact point in the first-axis direction.

12. The multi-touch detection method as claimed in claim 11, further comprising: when the first electrodes are sequentially sensed, providing the first voltage to the first electrodes which are not sensed.

13. A multi-touch detection method for a touch panel, wherein the touch panel comprises a first conductive layer and an overlapping second conductive layer, the first conductive layer having a plurality of first electrodes disposed along a first-axis direction, the second conductive layer having a plurality of second electrodes and third electrodes along a second-axis direction, and the second electrodes and the third electrodes are respectively disposed at different sides of the second conductive layer along the first-axis direction, the multi-touch detection method comprising:
sensing the second electrodes sequentially to obtain a first voltage function when a first voltage is provided to a first portion of the first electrodes simultaneously and is not provided to a second portion of the first electrodes;

sensing the third electrodes sequentially to obtain a second voltage function when the first voltage is provided to the second portion of the first electrodes simultaneously and is not provided to the first portion of the first electrodes;

deeming a position corresponding to an extreme value of the first voltage function as a position of the first contact point in the second-axis direction; and deeming a position corresponding to an extreme value of the second voltage function as a position of the second contact point in the second-axis direction;

wherein the first portion of the first electrodes contains at least two first electrodes, wherein the second portion of the first electrodes contains at least two first electrodes;

wherein when the second electrodes are sequentially sensed, a ground voltage is provided to the second electrodes before been sensed;

wherein when the third electrodes are sequentially sensed, a ground voltage is provided to the third electrodes before been sensed.

14. The multi-touch detection method as claimed in claim 13, wherein the first conductive layer and the second conductive layer are anisotropic in electric conductivity.

15. The multi-touch detection method as claimed in claim 14, wherein the first conductive layer and the second conductive layer each have a low impedance direction and a high impedance direction, the low impedance direction of the second conductive layer is the first-axis direction, and the low impedance direction of the first conductive layer is the second-axis direction.

16. The multi-touch detection method as claimed in claim 14, wherein the first conductive layer and the second conductive layer are conductive films formed by carbon nanotubes arranged substantially in parallel.

17. The multi-touch detection method as claimed in claim 13, wherein the first-axis direction and the second-axis direction are substantially perpendicular to each other.

18. The multi-touch detection method as claimed in claim 13, further comprising: when the second electrodes and the third electrodes are sequentially sensed, providing a second voltage to the second electrodes and the third electrodes which are not sensed.

19. The multi-touch detection method as claimed in claim 13, further comprising: when the first voltage is provided to the first portion of the first electrodes, providing a second voltage to the second portion of the first electrodes.

20. The multi-touch detection method as claimed in claim 13, further comprising: sensing the first electrodes to obtain a third voltage function when a second voltage is provided to at least one of the second electrodes and the third electrodes; and respectively deeming positions corresponding to two extreme values of the third voltage function as positions of the first contact point and the second contact point in the first-axis direction.

21. The multi-touch detection method as claimed in claim 20, further comprising: when the first electrodes are sequentially sensed, providing the first voltage to the first electrodes which are not sensed.

* * * * *